US008181630B2

(12) United States Patent
Kennedy

(10) Patent No.: US 8,181,630 B2
(45) Date of Patent: May 22, 2012

(54) INDUCTION REGULATOR BLOCK

(76) Inventor: Roger Kennedy, Manchester (GB)

( * ) Notice: Subject to any disclaimer, the term of this patent is extended or adjusted under 35 U.S.C. 154(b) by 1021 days.

(21) Appl. No.: 12/084,833

(22) PCT Filed: Nov. 10, 2006

(86) PCT No.: PCT/GB2006/050381
§ 371 (c)(1),
(2), (4) Date: Jun. 2, 2008

(87) PCT Pub. No.: WO2007/054743
PCT Pub. Date: May 18, 2007

(65) Prior Publication Data
US 2009/0107444 A1 Apr. 30, 2009

(30) Foreign Application Priority Data

Nov. 10, 2005 (GB) .................................. 0522982.8

(51) Int. Cl.
F02M 61/14 (2006.01)
F02B 31/00 (2006.01)
F02B 31/04 (2006.01)
F02D 9/00 (2006.01)
(52) U.S. Cl. ......... 123/470; 123/306; 123/308; 123/590
(58) Field of Classification Search ............. 123/184.53, 123/184.55, 306, 308, 470, 590
See application file for complete search history.

(56) References Cited

U.S. PATENT DOCUMENTS

| 4,347,816 | A |   | 9/1982  | Saito et al.      |         |
|-----------|---|---|---------|-------------------|---------|
| 4,348,997 | A |   | 9/1982  | Takeda et al.     |         |
| 4,478,607 | A |   | 10/1984 | Capps             |         |
| 4,768,487 | A | * | 9/1988  | Yamamoto et al.   | 123/470 |
| 5,163,406 | A | * | 11/1992 | Daly et al.       | 123/456 |
| 5,638,797 | A | * | 6/1997  | Kim               | 123/592 |
| 5,673,673 | A |   | 10/1997 | Beck              |         |
| 5,873,344 | A | * | 2/1999  | Kudou et al.      | 123/295 |
| 6,257,212 | B1 |  | 7/2001  | Hammond           |         |
| 6,269,805 | B1 |  | 8/2001  | Wilson            |         |
| 6,601,562 | B2 | * | 8/2003  | Buswell et al.    | 123/306 |
| 6,655,348 | B1 | * | 12/2003 | Jessberger et al. | 123/308 |
| 6,659,075 | B1 | * | 12/2003 | Tokuyasu et al.   | 123/301 |
| 6,772,729 | B2 | * | 8/2004  | Brosseau et al.   | 123/308 |
| 6,782,872 | B2 | * | 8/2004  | Moschini et al.   | 123/470 |
| 6,895,924 | B2 | * | 5/2005  | Buswell et al.    | 123/306 |
| 7,096,849 | B1 | * | 8/2006  | Mathis et al.     | 123/306 |
| 2003/0217739 | A1 | | 11/2003 | Saeki et al.   |         |
| 2004/0000290 | A1 | | 1/2004  | Lee et al.     |         |

FOREIGN PATENT DOCUMENTS

WO  WO 01/63107    8/2001
WO  WO 2005/061879 7/2005

* cited by examiner

Primary Examiner — Noah Kamen
Assistant Examiner — Grant Moubry
(74) Attorney, Agent, or Firm — Gerald E. Hespos; Michael J. Porco

(57) ABSTRACT

The invention provides a manifold block for improving the efficiency of an internal combustion engine. The manifold block is arranged to be located between an inlet manifold and a cylinder head of the engine, and comprises a block of material having at least one manifold channel there through. The manifold channel has an input end and an output end, wherein the input end is connected to the inlet manifold, and the output end is connected to the cylinder. The manifold channel includes at least one injector head channel located towards its input end and adapted to receive a fuel injector. The manifold block may also incorporate one or more induction regulators for improving the efficiency of fuel/air mixing in the manifold channels.

24 Claims, 5 Drawing Sheets

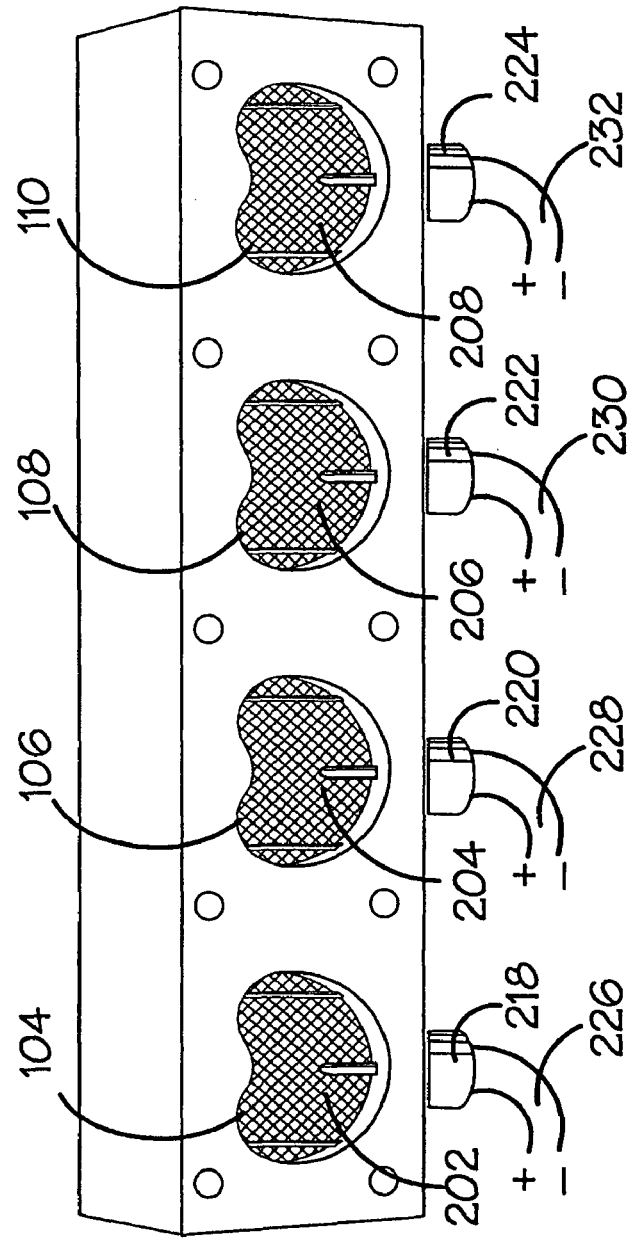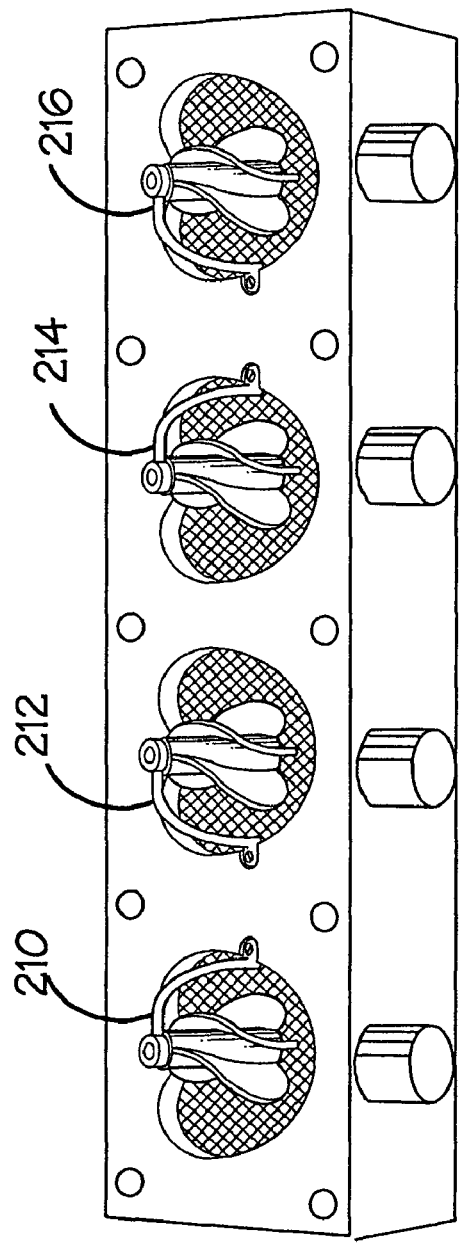

INDUCTION REGULATOR BLOCK

BACKGROUND OF THE INVENTION

1. Field of the Invention

The present invention relates to a manifold block for an internal combustion engine and in particular a manifold block that promotes mixing of fuel and air in the engine upstream of the cylinder head, improving the efficiency, emissions profile and/or power of the engine. The block may also incorporate an induction regulator further to facilitate fuel/air mixing.

2. Description of the Related Art

It is well known to use a fuel injector to control the fuel/air mixture ratio in an engine. Conventional fuel injection systems are generally adapted to monitor the amount of fuel supplied to the engine, or to each cylinder thereof, the timing and duration of each injection event being controlled to provide a desirable fuel/air mixture in the cylinder. However, conventional injector systems are generally not designed to optimize the mixing of fuel and air upstream of the cylinder(s), and the present invention seeks to provide a means for optimizing this aspect of injector systems.

WO-A-01/63107 discloses an internal combustion engine for liquid petroleum gas or compressed natural gas and particularly an internal combustion engine fitted with a pressure release valve operable (by electrical or mechanical means) to open during the compression stroke if the pressure in the cylinder exceeds a predetermined value corresponding to the maximum desired compression ratio in the cylinder, but is held shut during the ignition stroke. When the valve is open during the compression stroke, excess fuel/air mixture is bled from the cylinder and passes through a one-way valve and a cryocooler to the inlet manifold where it mixes with fresh incoming air. The system may also be used in petrol/diesel engines which have been modified to use gas as fuel.

GB-A-2,390,116 discloses an intake manifold, fuel rail and moulded injector pack assembly for internal combustion engines having configurations which result in the necessity for only a single seal at the connection between the fuel rail and moulded injector pack assembly.

WO-A-02/25092 discloses a method and apparatus for mechanically gasifying an atomized fuel/air mixture. This apparatus comprises a housing in which is disposed a stator body, the inner surface of which has an array of pins projecting inwards therefrom. There is also provided a rotor body having an array of pins projecting outwards from the outer surface thereof. The rotor is arranged to rotate at high speed and is located such that its pins intermesh with those of the stator. A motor (driven by compressed air/exhaust gas/electrical motor) is provided to drive the rotor. The housing is closed at either end save for an inlet at one end for receiving atomised fuel from an injector, and an outlet at the other end for directing gaseous fuel into an intake manifold/intake valves of an internal combustion engine. The fuel is gasified by way of the rotor/stator pins striking fuel droplets, thereby creating smaller droplets. In one embodiment, the "stator" may be arranged to rotate in a direction opposite to that of the rotor to increase relative velocities between the pins.

U.S. Pat. No. 5,673,673 discloses a method and apparatus for injecting gaseous fuel at velocities of the order of Mach 1 into an air stream flowing into an intake port of an internal combustion engine. The apparatus is mounted between the intake port of the internal combustion engine and the air intake manifold. The injection apparatus is arranged to inject the gaseous fuel into the air stream at between Mach 0.5 and Mach 1 to achieve uniform mixing of the fuel and air. Key to achieving these high injection speeds are the effective flow areas of the injector metering orifice (i.e. the orifice from which the gaseous fuel leaves the injector and enters a conduit leading to a discharge orifice) and the conduit discharge orifice. In particular, an effective flow area for the conduit discharge orifice of between two and five times greater than the effective flow area of the injector metering orifice is effective in achieving these high injection speeds. A further requirement for achieving the high injection speeds is that the pressure at which the gaseous fuel is supplied is more than four times the air intake manifold absolute pressure.

GB-A-2,409,499 discloses a regulator with driven propeller for intake or exhaust manifolds of internal combustion engines.

U.S. Pat. No. 4,478,607 discloses a device for atomizing and dispersing fuel in a fuel/air mixture. The fuel mixer/atomizer comprises a hollow cylindrical body provided with a propeller to mix the air and fuel (driven by fuel flow) and a screen serving the dual purpose of trapping debris and further atomizing the fuel.

U.S. Pat. No. 6,269,805 discloses a manifold spacer, which comprises an apparatus adapted to be inserted between an outlet of a carburettor and the inlet of an intake manifold. The apparatus comprises a body member having an opening therethrough, the size of which is consistent with the outlet opening of the carburetor and the inlet of the intake manifold. Nitrous oxide and fuel manifolds span the opening and are provided with a plurality of orifices to direct spray downwards towards the inlet of the intake manifold.

These prior art devices each suffer from one or more of the following disadvantages: they are overly complex in design, giving rise to additional cost and likelihood of mechanical failure; they are difficult to retrofit; they do not work satisfactorily in practice to improve engine performance; they do not work satisfactorily in practice to decrease engine emissions.

It is an object of the present invention to provide an induction regulator block for an internal combustion engine which ameliorates one or more of the aforesaid problems. In particular, it would be desirable to provide a means for retrofitting to an existing engine a device effective to improve the mixing of fuel and air supplied to the cylinder head (or heads) thereof.

It is therefore an object of the present invention to provide a manifold block for an internal combustion engine for improving the efficiency, emissions profile and/or power thereof.

SUMMARY OF THE INVENTION

Accordingly, the present invention provides a manifold block for improving the efficiency of an internal combustion engine, the block being adapted to be located between an inlet manifold of the engine and a cylinder thereof, the block having at least one manifold channel therethrough, the manifold channel having an input end and an output end, wherein the input end communicates in use with the inlet manifold and the output end communicates in use with the cylinder, the manifold channel including at least one injector head channel located towards its input end and adapted to receive a fuel injector, said injector head channel being orientated with respect to the longitudinal manifold channel axis and/or with respect to the transverse manifold channel axis at an angle of convergence from 5° to 85° such that fuel injection into the manifold channel impinges against the manifold channel wall and adopts, by virtue of the convergence angle, a swirling path of motion through the manifold channel.

In use, the manifold block of the invention is fitted between the inlet manifold and the cylinder head, thereby increasing the distance between the fuel injection point and the cylinder head, and at least partly because of the angle of convergence of fuel injection with respect to the manifold channel axis, is arranged to facilitate turbulent mixing of the injected fuel in the manifold channel. To this end, the injector head channel is oriented with respect to the manifold channel axis, such that fuel injected into the manifold channel impinges against the manifold channel wall thereby adopting a substantially swirling path of motion through the manifold channel. The axis of the injector head channel and the axis of the manifold channel at the location of injection converge at an angle of convergence effective to facilitate such swirling motion. The orientation may be with respect to the longitudinal channel axis of the manifold, or with respect to the transverse axis thereof, or with respect to both the longitudinal axis and the transverse axis. In each case, the convergence angle may be from about 5° to about 85°, preferably from about 15° to about 75°, more preferably from about 20° to about 70°, and most preferably from about 20° to about 65°. A convergence angle of from about 25° to about 60° may be especially preferred in some cases.

Although the convergence angle is important to facilitate swirling motion in the fuel/air mixture entering the cylinder, it is also significant that the manifold block of the invention acts in use to increase the distance between the fuel injection point and the cylinder head, thereby allowing the fuel/air mixture space and/or time to adopt a swirling motion on entering the cylinder. In one sense this is facilitated by the manifold block having a length, which may usefully be defined as the manifold channel length therethrough, which is preferably more than about 1 cm, more preferably more than about 2 cm and most preferably more than about 3 cm. However it will be understood that the channel length will usefully be selected with regard to the type of engine to which the block is to be fitted, and the preferred length of the channel may therefore to some extent be determined by external factors. In some cases channel lengths of over 5 cm may be preferred.

Another aspect to the provision of swirling space upstream of the cylinder is the point at which the fuel is injected, which is preferably towards the upstream end of the block, thereby effectively extending the distance between the fuel injection point and the cylinder head.

It should be stressed that the manifold channel need not necessarily be a straight and/or uniform channel, although it may be. In the case of a non-straight and/or non-uniform channel, the longitudinal axis will be understood to be the axis parallel to the air flow in that part of the manifold, and the transverse axis is the axis normal to the airflow. It will be understood that a key feature of one preferred embodiment of the invention is that swirling motion of the fuel is initiated in the manifold channel upon injection of the fuel therein. Swirling of the fuel in the manifold channel assists the mixing of the fuel in the manifold channel and/or introduced into the manifold channel together with the fuel and/or via a separate injection head in the manifold channel, or above it. Once the fuel has commenced its swirling motion, bends, curves and/or irregularities in the manifold channel structure need not prevent continuance of such swirling motion. Preferably, however, the contour of the manifold channel is effective to promote, maintain, facilitate, or at least not unacceptably compromise, swirling motion of the fuel therein.

The injector head channel injects fuel and/or a fuel/air mixture into the manifold channel in operation of the invention. There may be one or more such injector head channel in each manifold channel of a manifold block according to the invention. Preferably each injector head channel is situated towards the upstream end of the manifold channel in use of the invention. In this way, the distance between the injector head and the cylinder head of the engine is maximized. Means may also be provided to alter the position and/or orientation of the injector head channel to control the direction of the injected fuel in response to the particular requirements of the engine.

In some engines, fuel and air are injected separately, and it may be desirable in this case to provide the manifold block with separated injection heads for fuel and air injection. Alternatively, or as well, it may be convenient in some cases to provide a first manifold block with a fuel injection head therein, and a second manifold block in fluid communication with the first via their respective manifold channels with an air injection head therein.

The manifold block of the invention may be used in petrol-driven engines, diesel-driven engines, and engines which are fuelled by other types of fuel (bio fuels for example), or combinations thereof. Such engines may be found, for example, in cars, lorries, trucks, wagons, off-road vehicles, tanks, tractors, motorbikes, aircraft, seacraft, and in agricultural/horticultural vehicles and tools. Moreover, the manifold block may be fitted to a single cylinder engine, or to a multi-point engine. In a multi-point engine the manifold block will generally comprise a single block of suitable material with a plurality of manifold channels therein, the number of manifold channels corresponding with the number of cylinder heads in the engine. Preferably the outlet ends of each manifold channel are machined to match in contour the inlet port of the engine cylinder head. Thus, the manifold channel may be cylindrical but may be any suitable shape.

The manifold block of the invention is effective to improve the combustion efficiency of an internal combustion engine by providing sufficient distance between the fuel injector and the combustion cylinder of the engine, so that the injected fuel has sufficient opportunity to mix with the air, through turbulent mixing, prior to combustion, thereby improving fuel vaporisation and atomisation. Moreover, by improving combustion efficiency in this way, fuel consumption and unwanted exhaust emissions can be reduced.

In order to assist turbulent mixing of fuel and air through the manifold channel, the manifold channel may, in a preferred embodiment of the invention, be provided with an induction regulator therein, of the type described in PCT/GB02/01831, or in UK 0428194.5, or of another type as hereinafter described. Alternatively, or as well, such an induction regulator may be mounted in the cylinder head of the engine in use of the manifold block of the invention.

When fitted, the induction regulator may comprise one or more of the following elements:

A perforated element, such as a mesh or perforated plate, for example, mounted in the manifold channel, or beneath it.

A propeller mounted in the manifold channel, or beneath it.

A deflector grid mounted in the manifold channel, or beneath it.

The purpose of each of these elements, alone or in combination, is to cause the injected fuel in the manifold chamber (or the injected fuel/air mixture) to flow turbulently into the cylinder head downstream of the manifold channel.

When a perforated element is present, this may be mounted in or beneath the manifold channel to correspond in size with the cross-sectional size of the channel or, alternatively, may be sized to leave a peripheral gap between the manifold channel and the perforated element. The perforated element is preferably mounted at a tilt within the inlet manifold, or beneath it. The angle of the tilt, when present, is preferably from about 1° to about 45°, more preferably from about 2° to about 35°, most preferably from about 5° to about 25° from the horizontal, the horizontal being the arrangement in which the plane of the perforated element is normal to the longitudinal axis of the manifold channel at the location of the perforated plate therein or, if the perforated plate is mounted below the manifold channel, the longitudinal axis of the manifold channel at the outlet thereof extended in a straight line.

The perforated element is capable of allowing the passage of a fuel/air mixture there through, from the manifold channel upstream end in the region of the fuel injector to the manifold channel downstream end in the region of the cylinder head, and preferably of causing such passing material to mix turbulently. Means may be provided for mounting the perforated element in the manifold channel, or beneath it.

It is possible to provide more than one perforated element in the manifold channel, or beneath it. A number of configurations of perforated elements can be utilised, and such configurations are dependant upon the size and curvature of a specific manifold. In one embodiment, a first perforated element is disposed towards the upstream end of the manifold channel, and a second perforated element is disposed towards the downstream end of the channel, or beneath it.

Each perforated element may be rotatable about a shaft in the manifold channel further to enhance turbulent mixing of fuel/air passing therethrough. Furthermore, each perforated element may be operable between a closed position arranged to allow passage of fuel/air mixture through the perforations, and an open position arranged to allow passage of the fuel/air mixture bypassing the perforations.

The propeller, when present, may be freely rotatable, or may be driven by a motor. The propeller may be mounted in the manifold channel, or beneath it, and may be mounted at an angle with respect to the longitudinal axis of the manifold channel. Preferably the angle of the tilt, when present, is from about 0.6 to about 60 degrees, more preferably from about 5° to about 50°, most preferably from about 15° to about 40°. In one embodiment of the invention, the propeller is deployable in forward or reverse mode, and may therefore be rotatable (whether, freely, under the influence of fuel/air impinging thereagainst, or driven by a motor) in both clockwise and anti-clockwise directions. Preferably, the propeller is rotatable in the direction which maximises turbulent mixing of the fuel/air mixture in the manifold channel, and/or in which the fuel/air mixture upstream of the propeller in use of the invention is pulled downstream by the propeller blades in the most effective manner.

In one preferred embodiment of the invention, the manifold channel is provided (therein or therebelow) with a perforated element and, mounted beneath the perforated element, a driven propeller.

Preferably, the propeller has a longitudinal pin defining a rotation axis, and at least one blade attached to the pin. At least one blade is preferably attached to the pin by means of an elongated blade root which substantially follows the longitudinal axis of the pin. Preferably, the blade root follows the longitudinal axis of the pin in an at least partial helical manner. The length of the blade root may be greater than the distance between the blade tip and the pin. The length of the blade root may be substantially equal to the blade length. The term "blade root" should be taken to mean the area of the blade where the blade attaches to the propeller boss/pin. The blade may be substantially curved in shape and may have a substantially smoothly curving blade edge. Preferably the blade has a shape substantially of a semi-circle, an ellipse, a part-ellipse, a teardrop, a half-tear drop, a bell curve, a half-bell curve, a rectangle, a square, a triangle, or derivatives thereof. The blade may be wider towards one end of the blade root.

The function of the propeller is preferably to be effective to pull fluid material from a region upstream of the propeller to a region downstream of the propeller, and additionally to cause turbulent fluid flow in the region downstream thereof. In this case the propeller is preferably driven by a suitable motor using if appropriate a gearing mechanism or pulley. A single motor may drive a plurality of such propellers but it is also possible to provide separate motors for each propeller, or some of them.

Each propeller may be mounted in the manifold channel, or beneath it, by any suitable means such as for example one or more supporting straps or braces. However, the supporting straps need not be present, and the propeller may be mounted in the manifold channel in other ways. Preferably each propeller is mounted in a supporting framework with, if appropriate, suitable electrical connections for driving the propeller and data transfer lines for controlling the motion of the propeller, the supporting framework being securely attached to the manifold block.

Each blade of the propeller may be attached to the pin at different positions so that the blades may have a "staggered" appearance. Each blade may also be of a different or similar size, and indeed each blade may have a different shape from any other blade. The propeller is preferably sized to leave a small (generally a few mm) peripheral gap between the path swept by the propeller blades in use and the manifold channel wall inside or beneath which the propeller is mounted. When the propeller is used in combination with a perforated plate, the propeller is preferably sized so that the path swept by the propeller blades in use roughly corresponds in size with the perimeter/circumference of the perforated plate.

It is also possible to provide a plurality of propellers in any one manifold channel. These may be spaced along the manifold channel length, or part of it.

The deflector grid, when present may comprise one or more flanges protruding into the manifold channel, or into the path defined by an extension of the manifold channel when the grid is mounted beneath the channel. Any such flange is preferably arranged such that fuel/air mixture passing through the manifold channel impinges against an upstream surface of the flange and is thereby forced to flow with additional turbulence around the flange. More than one flange may be provided, and these may conveniently be arranged around the circumference of an insert member which may be fitted inside the manifold channel, or beneath it.

The manifold block of the invention may be used in combination with any one or more of the perforated plate, propeller and deflector grid. When present each of these devices form part of an induction regulator used in combination with the manifold block of the invention. Furthermore, means may be provided for heating the manifold block, the induction regulator, or any part thereof, in use of the invention in order to maximise fuel efficiency during cold engine start-up. When the induction regulator, or any part of it, is mounted beneath the manifold channel, it may protrude into the cylinder head in use of the invention.

The manifold block of the invention provides the advantage that it serves to separate the fuel injection poured from the cylinder head thereby to enhance fuel/air mixing in passage from the fuel injector to the cylinder head, optionally in conjunction with an induction regulator as herein before described. The manifold block may be deployed in a new-build engine, or may be retro fitted to an existing engine. Whilst the manifold block is for insertion between the cylinder head and the inlet manifold, in a new-build engine the block need not be an entirely separate component from the inlet manifold, the inlet manifold of the new build engine may instead be designed to incorporate the manifold block of the invention. Effectively in this case the block becomes part of the inlet manifold.

BRIEF DESCRIPTION OF THE DRAWINGS

The invention is described further hereinafter, by way of example only, with reference to the accompanying drawings, in which:

FIG. 4a schematically shows a top view of a manifold block with induction regulator according to the present invention:

FIG. 4b schematically shows a further view of the FIG. 4a block according to the present invention:

DETAILED DESCRIPTION OF THE PREFERRED EMBODIMENTS

In overview the present invention provides for a manifold head for attachment to an internal combustion engine. The block includes channels to allow the passage of fuel from an injector head and air from an air inlet manifold to a combustion cylinder of the engine. Each channel has an entrance end and an exit end. The number of channels generally corresponds to the number of cylinders in a particular engine.

Figure 1:
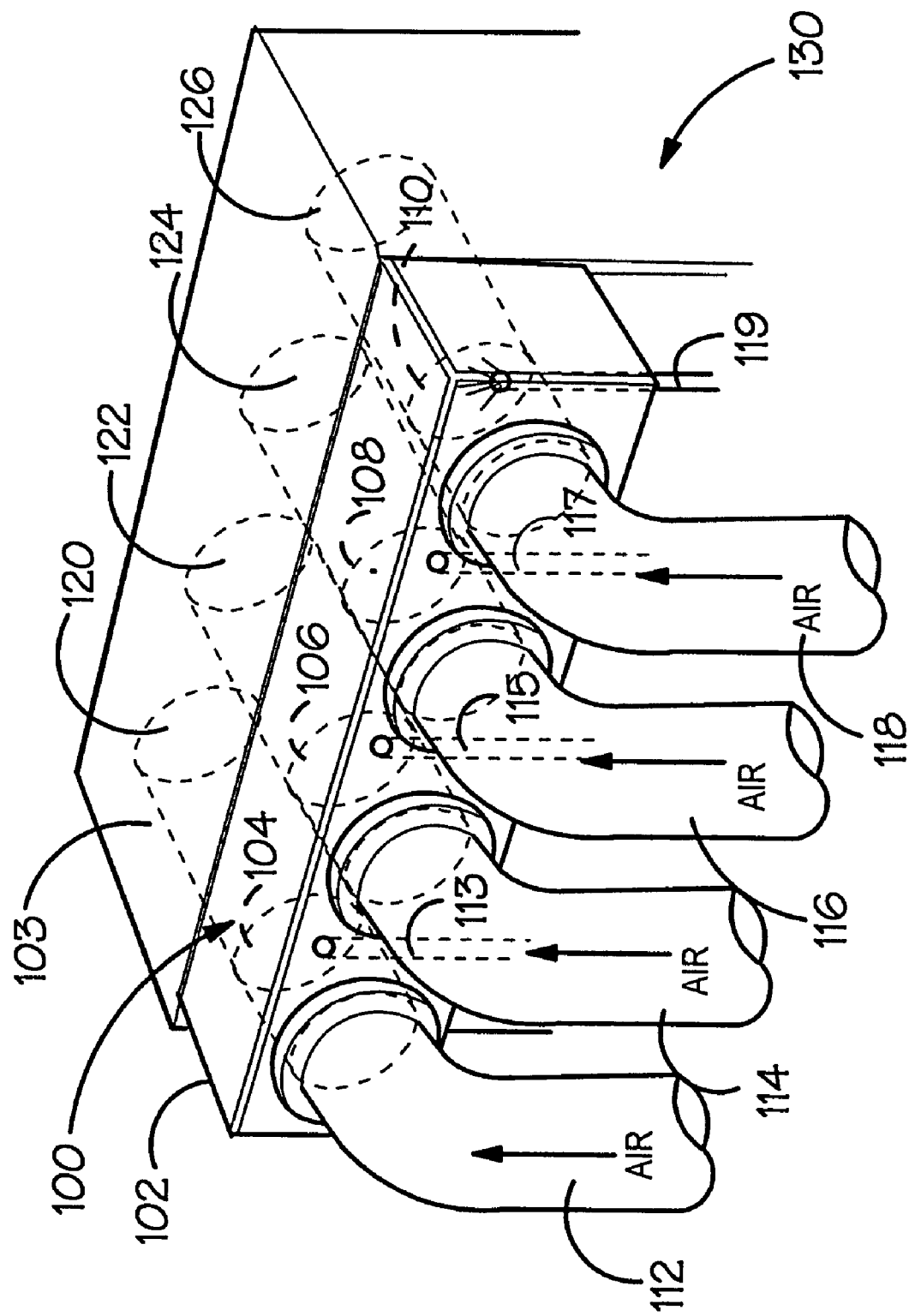
FIG. 1 schematically shows a perspective view of a conventional manifold and cylinder head.

Referring to FIG. 1, the conventional manifold head 100 may consist of a manifold head 102, having a plurality of manifold channels 104, 106, 108, 110 formed there through. The manifold head engages the cylinder head 103, and the manifold intake channels 112, 114, 116, 118 feed air into the cylinders 120, 122, 124, 126 via manifold channels 104, 106, 108, 110. Fuel injection occurs at the cylinder head in the prior art arrangement of FIG. 1 as indicated by 113, 115, 117, 119.

Air is drawn up into the manifold channel 112 (for ease of explanation only one set of description numerals are referred to) of the manifold head 102, passed along the manifold channel 104, into the cylinder channel 120, where fuel is injected into the cylinder channel 120 via an injector head 113. The fuel/air mixture is ignited in the combustion cylinder channel 120.

Figure 2:
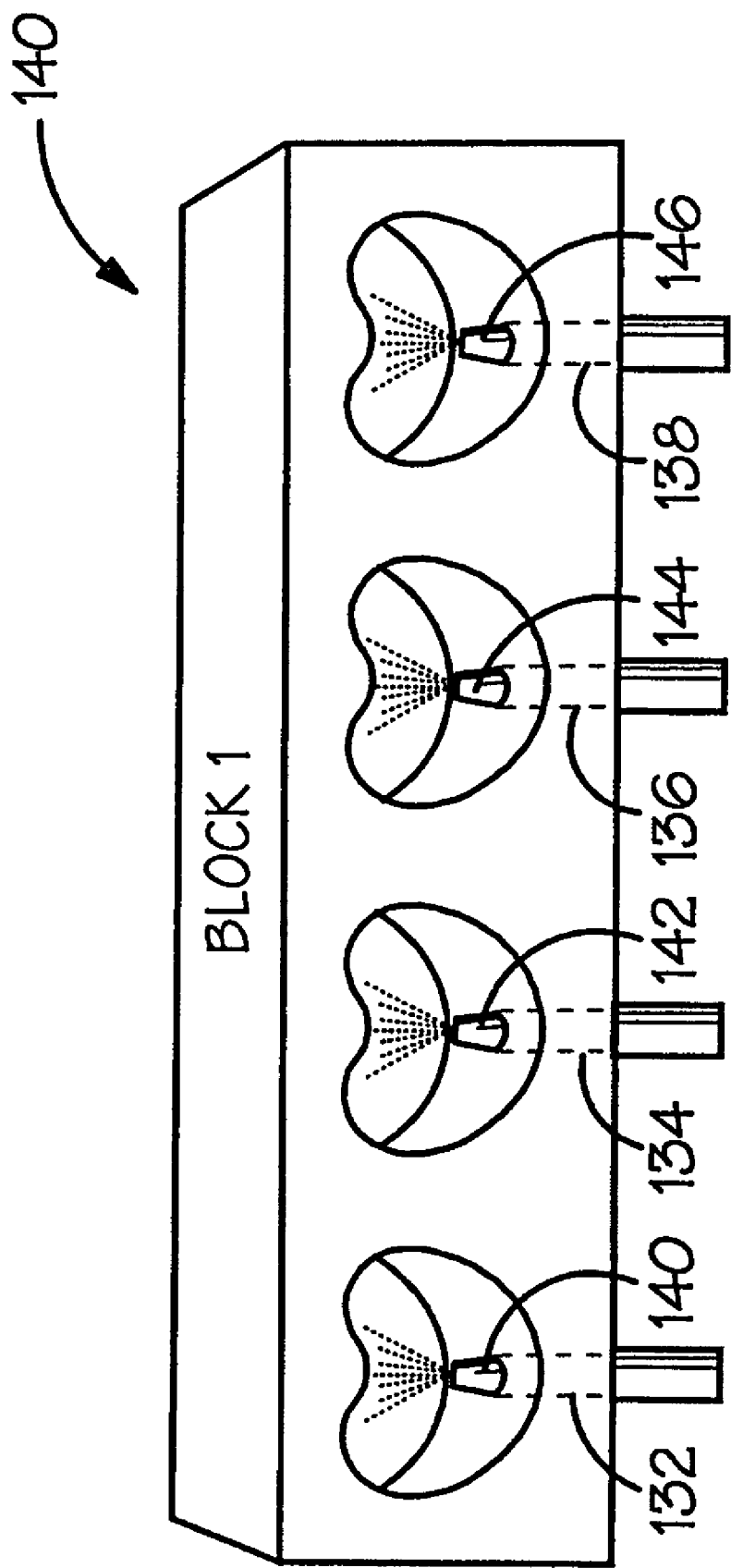
FIG. 2 schematically shows a plan view of a manifold block with injector channels according to the present invention.

Referring to FIG. 2 the block 140 according to the present invention includes a plurality of injector channels 132, 134, 136, 138, each of which are adapted to receive a fuel injector head as schematically represented in FIG. 2. The injector channels are arranged so that fuel injector heads 140, 142, 144, 146 can be inserted through the block at an angle (for example about 45 degrees) into the manifold channels with a swirling motion. The injector channels 132, 134, 136, 138 are arranged towards the top of the manifold block so that they are in spaced separation from the cylinder heads of the engine when deployed. Advantageously the block can also be attached to the engine during manufacture, or alternatively can be attached as a retro-fit device following manufacture.

Typically the block may measure about 35 cm in length and 9 cm in width and height, and may have a substantially rectangular in shape, although other shapes may also be used. Generally the height of the block and thus the length of each manifold channel must be adequate to provide sufficient distance between the injector head and the combustion cylinder so as to allow for mixing of the fuel/air mixture. However the dimensions of the block can vary in size, dependent on the size and application of the engine, and also space available in the engine compartment. The dimensions and relative positions of the standard manifold channels are dependant on the positions of the inlet manifolds 112, 114, 116, 118 to the cylinders 120, 122, 124, 126 of the engine 130. The conventional manifold block example illustrates a 4-cylinder engine; however, conventional manifold blocks may have any number of cylinders, including any arrangement of those cylinders, for example so-called "V" or "in-line" arrangements.

Block 1 140 may incorporate any number of injector channels, and indeed it is possible to facilitate multipoint injection whereby each manifold channel can incorporate multiple fuel injectors. In this case at least one, but preferably all of the injector head channels should be mounted at a convergence angle with respect to the manifold channel. The dimensions of the injector channels are dependant on the size of the injector heads used, and also on the engine size and space available in the engine compartment.

Figure 3:
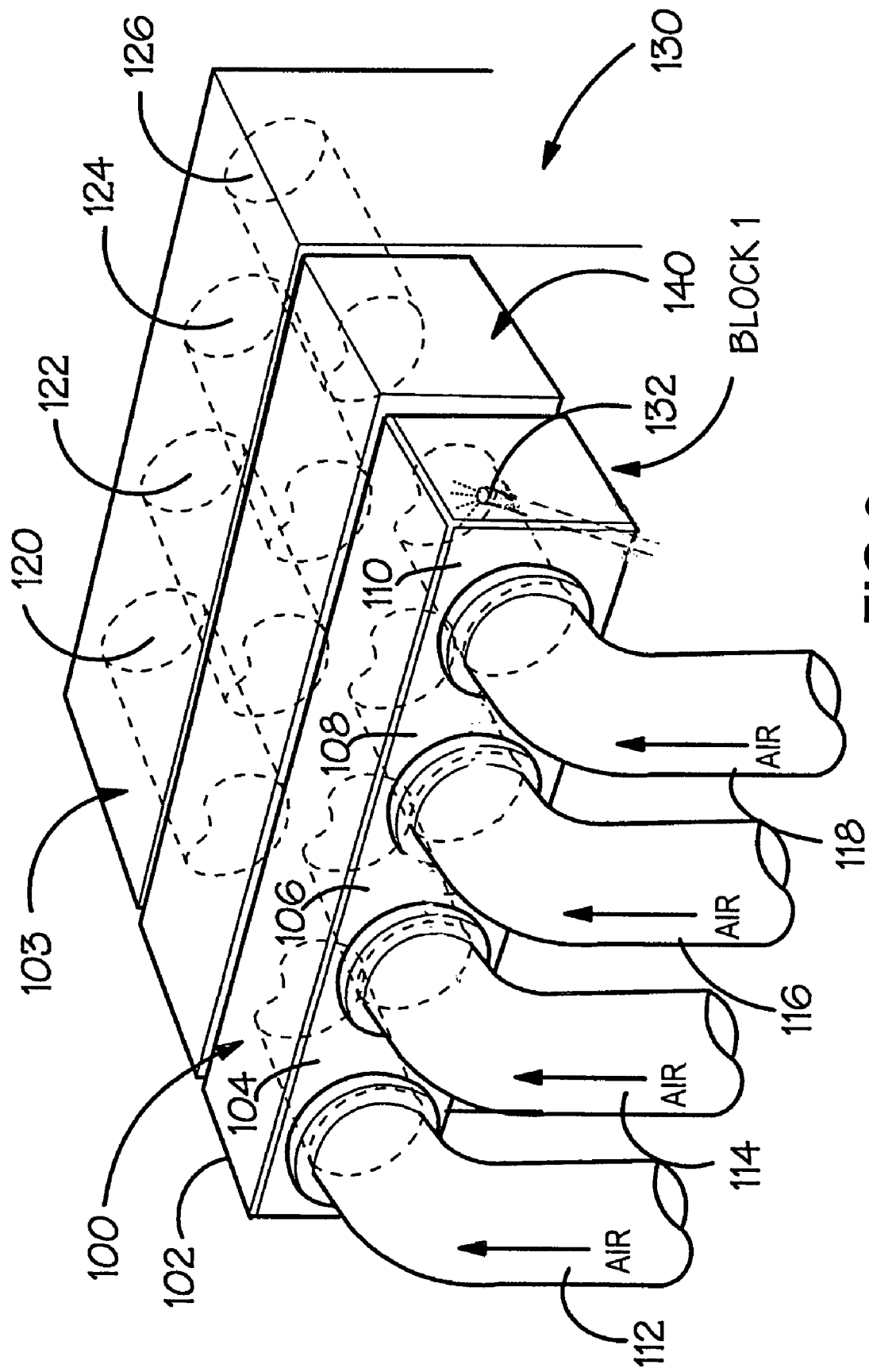
FIG. 3 schematically shows a perspective view of the manifold block shown in FIG. 2 when inserted in the manifold and cylinder head arrangement of FIG. 1.

Referring to FIG. 3 the manifold block 140 according to the present invention is shown incorporated in the engine head arrangement. The block 140 can be formed of a single piece of material, and can be manufactured from material, for example plastic, metal or ceramic, as can be understood by those skilled in the art. For ease of reference, only one injector 132 is shown in FIG. 3.

In the preferred embodiment of FIG. 3 (and with reference only to one of the air intakes), air is drawn up into the manifold channel 118 and passes along the manifold channel 110, into block 140, where fuel is injected at a convergence angle from the injector head 132 thereby providing optimised swirling of the fuel/air mixture entering the cylinder head channel 126. The distance from the fuel injector 132 to the exit end of block 140 allows for substantial mixing of the fuel/air mixture prior to entrance into the cylinder head 103.

As schematically represented in FIGS. 4a and 4b, a second block extending manifold channels 104, 106, 108, 110 can further incorporate an induction regulator 202, 204, 206, 208. The induction regulators are situated in use downstream of the injector channels and in the depicted arrangement will be situated before the exit end of the manifold channel. However, in other embodiments the induction regulator may be provided in the cylinder head channel.

Each induction regulator in this particular embodiment comprises a perforated element, which may be formed of a wire mesh, gauze or any perforated material, The perforated element is preferably angled between 13 to 25 degrees with respect to the horizontal, for example at about 17 degrees. The perforated element may extend across the circumference of the manifold channel, providing no gap around the circumference of the perforated element. Alternatively, there may be a small gap around the circumference of the perforated element separating it from the walls of the manifold channel. Each perforated element can be fixed within its respective manifold channel by any suitable supporting number.

FIG. 4b illustrates the underside of the manifold block, as viewed towards the exit end of the manifold channel. Optionally the induction regulator can also include a propeller element 210, 212, 214, 216. In this embodiment, the propeller elements are situated down stream of the perforated element and are mounted centrally using a supporting frame within each manifold channel, so that each can rotate around a spindle mounted in the manifold channel at an angle (from about 0.6 to about 60 degrees with respect to the longitudinal axis of the manifold channel, for example).

The propellers can include a plurality of blades that are angled to the central axis of the propeller. The propellers have dimensions that substantially match those of the manifold channels, whilst allowing the propellers to rotate within each manifold channel. The propellers can be formed from any appropriate material, such as metal, ceramic or plastic. The shape can be an appropriate shape, such as elliptical, tear drop, bell, curve, triangular, rectangular or any variation thereof.

Each propeller element can be arranged so that it is free to rotate under the influence of the force applied by the fuel/air mix flowing past it. However, the block can further incorporate a plurality of apertures 218, 220, 222, 224, each aperture adapted to receive an electric motor 226, 228, 230, 232 which is in turn adapted to rotate the propellers independently of the force applied by the fuel/air mixture. The number of motors used depends on the size of the engine, and the number used generally corresponds to the number of cylinders in the engine in question. Alternatively, a single motor can be used to drive each propeller using an arrangement of gears or pulleys.

The perforated element and the propeller element can be heated using an electrical heating means (not illustrated) which can be powered by any appropriate means.

The manifold block 1 of FIG. 2 of the present invention can utilise any combination of perforated element and propeller element of block 2 FIGS. 4a and 4b, such that either the propeller or the perforated element can be used independently of each other. Also, the perforated element and the propeller can be arranged in any order, either upstream or downstream of one another.

Figure 5:
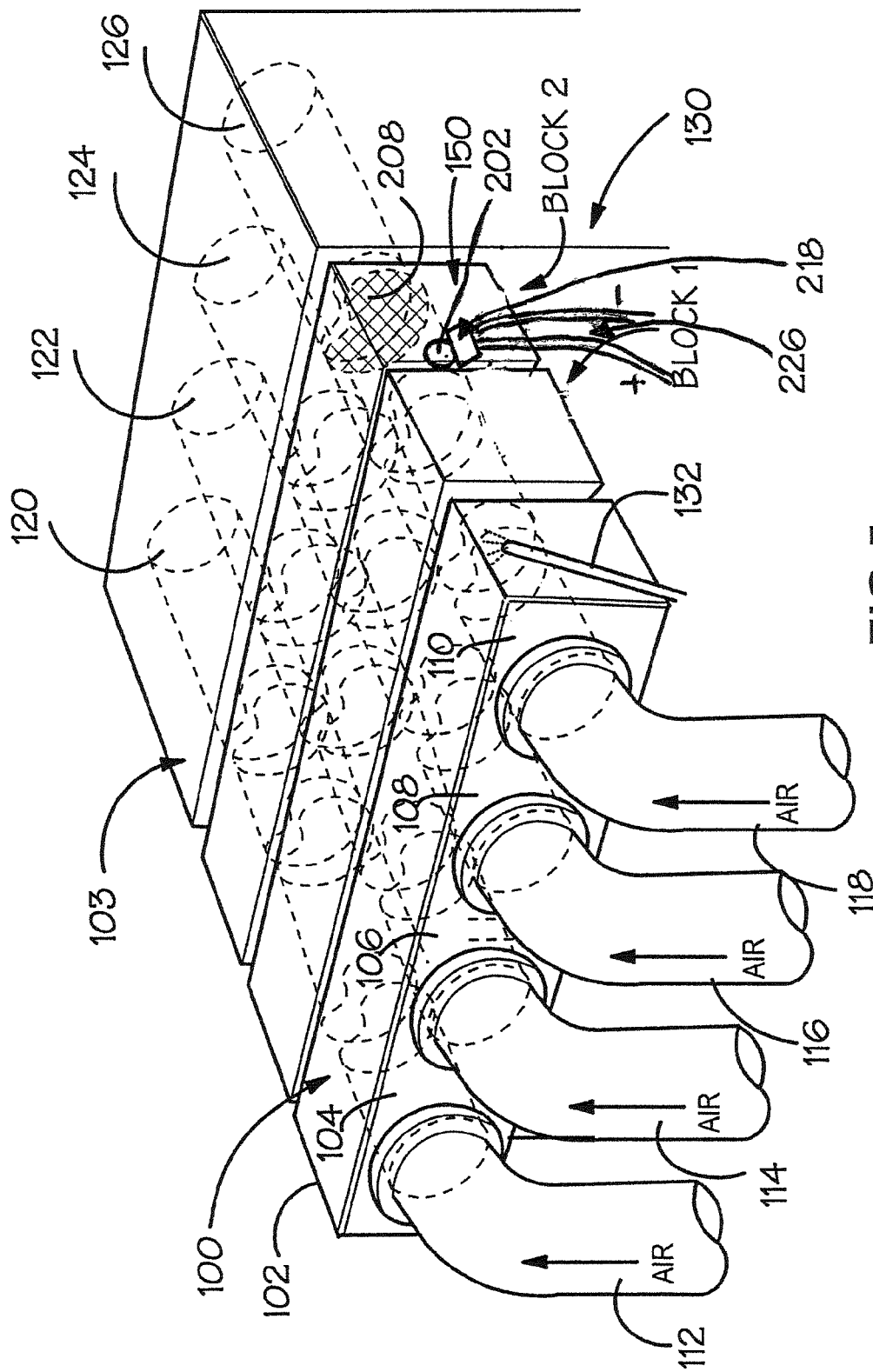
FIG. 5 schematically shows a perspective side view of the block of FIGS. 2 and 4a and 4b inserted in the manifold and cylinder head arrangement of FIG. 1.

Referring to FIG. 5 the manifold block 100 may be formed of 3 parts 100, (block 1) 140 and (block 2) 150.

In a preferred embodiment of FIG. 5, air is drawn up into the manifold channel 112 and passes along the manifold channel 104, into the block 1 channel 140, where fuel is injected at an optimal angle from the injector head 132 into block 1 140 whereby the fuel/air mixture adopts a swirling path of motion. The length of the channel allows the fuel/air mixture to substantially mix prior to entering block 2 150. The fuel/air mixture passes through the induction regulator 202, consisting of a perforated element, causing further mixing of the fuel/air mixture enhanced by the propeller located directly beneath the perforated element. The fuel/air mixture is ignited in the combustion cylinder channel 120 and passes out the cylinder channel exit end.

It should be appreciated that whilst the fuel injection block 1 140, and induction regulator block 2 150 are depicted as separate entities, they may both be incorporated in a single block.

The block can be fitted to any type of engine, whether petrol or diesel or other fuel, and can be used in conjunction with direct or indirect injection engines.

EXAMPLES

A Ford Focus 1.6 engine was tested to ascertain the emissions and torque of an engine incorporating the manifold block of the present invention inserted between a conventional manifold and a conventional cylinder head. These tests sought to identify change in emissions, BHP and torque which occurred when different sized blocks in accordance with the invention were fitted on the vehicle.

In order to fit the new block the conventional manifold, fuel rail, and injector were first removed, exposing the cylinder head. The block of the invention was then fitted on the cylinder head. For the purpose of these experiments it was in some cases found necessary to secure a gasket between the cylinder head and the block to make the connection airtight. In this case the gasket was fitted to the underside of the manifold block. The manifold block is then carefully placed on top of the cylinder head and the original inlet manifold is then fitted on top of the manifold block, again if necessary with the aid of a gasket. The original injector holes are plugged and made air tight. The fuel rail and injector are inserted into the injector head channels of the manifold block at a convergence angle. The fuel rail and injector may need altering depending on the size of the manifold block that is inserted.

Several tests were run between idle, 35, 50 and 70 miles per hour at various time intervals, post cat and pre cat emissions were then measured.

Emissions analysis was conducted using a Sun Modular 4 gas analyser, and Sun Ram 12 rolling road was used to measure power and torque.

Table 1 shows $CO_2$ emission data from three manifold block formations namely; block, block ML 1.T, and block ML 1.T and ML 0.5, when inserted between a conventional manifold and cylinder head, to a conventional manifold and cylinder head, wherein the term block refers to the manifold block of the present invention.

TABLE 1

|  | Speed MPH | CO2 Emissions |
| --- | --- | --- |
| Block On | 70 | 6.92 |
|  | 50 | 13.7 |
|  | 35 | 13.7 |
|  | idle | 12.8 |
| Block Off | 70 | 8.3 |
|  | 50 | 13.57 |
|  | 35 | 13.6 |
|  | idle | 12.63 |
| Difference % | 70 | 16.6 |
|  | 50 | −1 |
|  | 35 | −0.7 |
|  | idle | −1.3 |
| Block ML 1.T Block On | 70 | 7.58 |
|  | 50 | 15.07 |
|  | 35 | 15.2 |
|  | idle | 15.33 |
| Block ML 1.T Block Off | 70 | 8.32 |
|  | 50 | 15.53 |
|  | 35 | 15.57 |
|  | idle | 15.57 |
| Difference % | 70 | 8.9 |
|  | 50 | 3 |
|  | 35 | 2.4 |
|  | idle | 1.5 |
| Block ML 1.T and ML 0.5 Block On | 70 | 7.91 |
|  | 50 | 15.13 |
|  | 35 | 15.2 |
|  | idle | 15.3 |
| Block ML 1.T and ML 0.5 Block Off | 70 | 8.32 |
|  | 50 | 15.53 |
|  | 35 | 15.57 |
|  | idle | 15.57 |
| Difference % | 70 | 4.8 |
|  | 50 | 2.6 |
|  | 35 | 2.4 |
|  | idle | 1.7 |

Table 2 shows hydrocarbon (HC) emission, $CO_2$ emission, and $O_2$ level data from a single manifold block formation namely; block ML 1.T, with a block present, inserted between a conventional manifold and cylinder head, to the same, with the exception of no block being present. Demonstrating the insertion of the manifold block of the present invention provides improved engine efficiency and reduced $CO_2$ emission, in comparison to a standard engine.

TABLE 2

| Detailed Test | Speed MPH | HC | CO2 | O2 |
|---|---|---|---|---|
| Block ML 1.T Block On | 70 | 183 | 8.51 | 0 |
| | 50 | 137.3 | 14.43 | 0.28 |
| | 35 | 169.7 | 14.37 | 0.36 |
| | idle | 330.3 | 13.43 | 1.57 |
| Block ML 1.T Block Off | 70 | 249 | 8.65 | 0 |
| | 50 | 167 | 14.63 | 0.23 |
| | 35 | 197 | 14.47 | 0.42 |
| | idle | 394 | 13.5 | 1.71 |
| Difference % | 70 | 26.4 | 1.6 | |
| | 50 | 17.9 | 1.4 | |
| | 35 | 13.7 | 0.7 | |
| | idle | 16.2 | 0.5 | |

Table 3 shows torque (ft.lb) measured at 500 RPM intervals between 1500 and 4500, following the insertion of the manifold block of the present invention, between a conventional manifold and cylinder head, and to the same, with the exception of no block being present. The inserted manifold block had a length of either, 102 mm, 64 mm, or 77 mm. Demonstrating the more preferable form of the invention was provided when the length of the manifold block was 64 mm, whereby providing overall maximum torque for the integers of RPM.

TABLE 3

| RPM | No Block (ft · lb) | 102 mm Block (ft · lb) | 64 mm Block (ft · lb) | 77 mm Block (ft · lb) |
|---|---|---|---|---|
| 1500 | 55.7 | 62.7 | 63.7 | 55.7 |
| 2000 | 70.1 | 73.5 | 81.9 | 83.2 |
| 2500 | 80.3 | 81.1 | 88.0 | 88.9 |
| 3000 | 87.7 | 81.9 | 87.2 | 87.7 |
| 3500 | 87.5 | 91.9 | 93.6 | 91.2 |
| 4000 | 93.1 | 94.8 | 93.7 | 94.3 |
| 4500 | 90.3 | 94.8 | 97.0 | 96.2 |

These results demonstrate that the incorporation of the manifold block of the invention into an engine can improve engine efficiency, emissions profile and/or power.

The invention claimed is:

1. A manifold block for improving the efficiency of an internal combustion engine, the block being adapted to be located between an inlet manifold of the engine and a cylinder thereof, the block having a plurality of manifold channels therethrough, the manifold channels each having an input end and an output end, wherein the input end communicates in use with the inlet manifold and the output end communicates in use with the cylinder, each manifold channel including at least one injector head channel located towards the input end of the manifold and adapted to receive a fuel injector, each manifold channel having a longitudinal axis and a transverse axis, said injector head channel being orientated with respect to at least one of the longitudinal and transverse axes of the manifold channel at an angle of convergence from 5° to 85° such that fuel injection into the manifold channel impinges against a manifold channel wall and adopts, by virtue of the convergence angle, a swirling path of motion through the manifold channel.

2. A manifold block according to claim 1 fitted between the inlet manifold and a cylinder head of the engine, thereby increasing a distance between a fuel injection point and the cylinder head of the engine.

3. A manifold block according to claim 1 arranged in the engine to facilitate turbulent mixing of the injected fuel in the manifold channel.

4. A manifold block according to claim 1 wherein an axis of the injector head channel and one of the axes of the manifold channel at a location of injection converge at an angle of convergence effective to facilitate swirling motion of a fuel/air mixture therein.

5. A manifold block according to claim 1 wherein the angle of convergence of the injector head channel is selected to cause the fuel injected into the manifold channel to adopt a swirling path of motion through the manifold channel independent of a swirling motion caused by impingement of the fuel against the manifold channel wall.

6. A manifold block according to claim 1 wherein the angle of convergence of the injector head channel is with respect to the longitudinal axis of the manifold channel.

7. A manifold block according to claim 1 wherein the angle of convergence of the injector head channel is with respect to the transverse axis of the manifold.

8. A manifold block according to claim 1 wherein the angle of convergence is from about 15° to about 75°.

9. A manifold block according to claim 8 wherein the angle of convergence is from about 20° to about 70°.

10. A manifold block according to claim 9 wherein the angle of convergence is from about 20° to about 65°.

11. A manifold block according to claim 10 wherein the angle of convergence is from about 25° to about 60°.

12. A manifold block according to claim 1 wherein the injector head channel is upstream of the manifold channel in use of the block.

13. A manifold block according to claim 1, wherein the manifold channel is arranged to receive a perforated element which allows the passage of a fuel/air mixture there through, and means for mounting the perforated element in the manifold channel.

14. A manifold block according to claim 13 wherein the manifold channel is further adapted to receive a propeller element, and means for mounting the propeller element in the manifold channel.

15. A manifold block according to claim 14, wherein the perforated element and the propeller element are situated between the injector head channel and the output end of the manifold channel.

16. A manifold block according to claim 15 wherein the propeller element is driven by a motor.

17. A manifold block according to claim 1 wherein the number of manifold channels corresponds to the number of cylinders of the internal combustion engine.

18. A manifold block according to claim 1 connected to the engine block of an internal combustion engine.

19. A manifold block according to claim 1 wherein the manifold channel has a length so that in use of the block the inlet manifold and the cylinder are in spaced relationship.

20. A manifold block according to claim 19 wherein the channel length in the block is at least about 1 cm.

21. A manifold block according to claim 20 wherein the channel length in the block is at least about 2 cm.

22. A manifold block according to claim 21 wherein the channel length in the block is at least about 3 cm.

23. A manifold block according to claim 22 wherein the channel length in the block is at least about 5 cm.

24. A manifold block according to claim 1 wherein the manifold block is heated.

* * * * *